J. H. MARVIL OF V.
TIRE REPAIR PATCH.
APPLICATION FILED DEC. 13, 1913.
1,102,939.
Patented July 7, 1914.
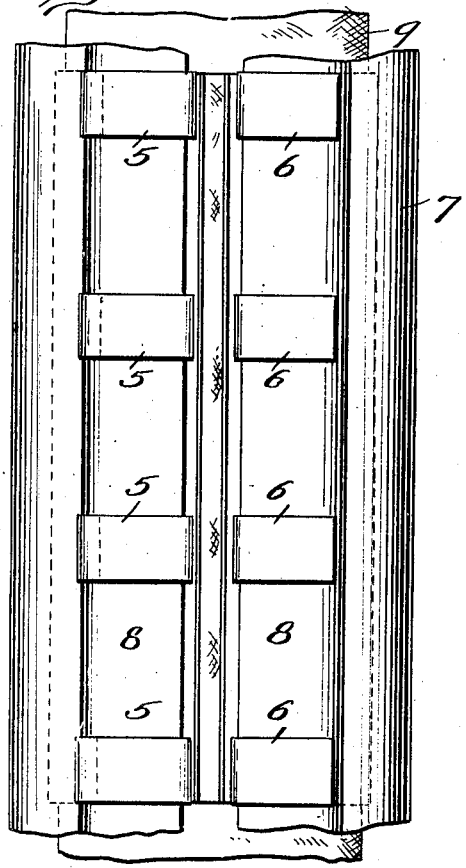
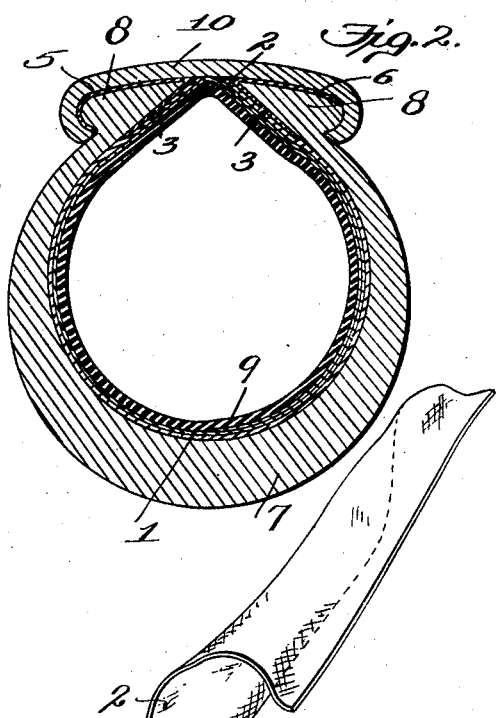
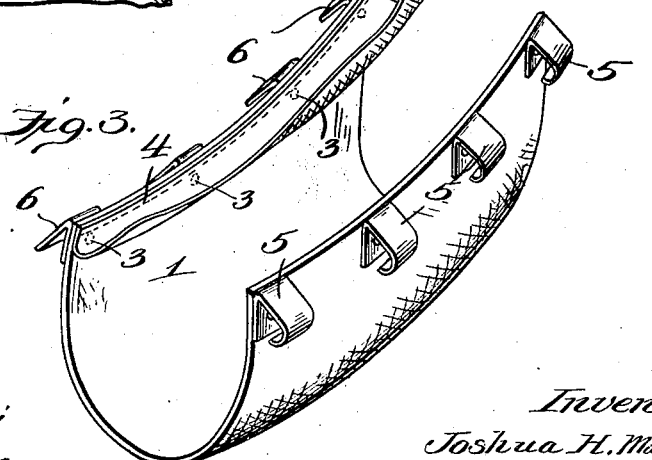
Witnesses:
Inventor
Joshua H. Marvil of V.

UNITED STATES PATENT OFFICE.

JOSHUA H. MARVIL OF V., OF LAUREL, DELAWARE, ASSIGNOR, BY DIRECT AND MESNE ASSIGNMENTS, OF ONE-THIRD TO JOSHUA D. MARVIL AND TWO-THIRDS TO SIRMAN D. MARVIL, BOTH OF LAUREL, DELAWARE; SALLIE L. MARVIL AND FRANK B. SIRMAN, EXECUTORS OF SAID JOSHUA D. MARVIL, DECEASED.

TIRE-REPAIR PATCH.

1,102,939.  Specification of Letters Patent.  Patented July 7, 1914.

Application filed December 13, 1912. Serial No. 806,503.

*To all whom it may concern:*

Be it known that I, JOSHUA H. MARVIL OF V., a citizen of the United States, residing at Laurel, in the county of Sussex and State of Delaware, have invented new and useful Improvements in Tire-Repair Patches, of which the following is a specification.

My present invention relates to patches for repairing pneumatic tires, and the primary object is to provide an improved patch adapted to be inserted between the inner tube and outer casing to cover a blow-out and thereby prevent blowing of the inner tube therethrough and to protect a broken or weakened portion of the outer casing and thereby prevent injury to the inner tube or blowing of the inner tube through such broken or weakened portion.

The patch provided by the present invention is capable of being applied easily and quickly, it will not slip or shift its position, and it protects the inner tube from injury.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 shows a pneumatic tire as viewed from the inner circumference and having a repair patch embodying the present invention applied thereto; Fig. 2 represents a transverse section through a pneumatic tire and wheel rim showing the repair patch applied thereto; Fig. 3 is a perspective view of the patch.

Similar parts are designated by the same reference characters in the several views.

Repair patches embodying the present invention are applicable generally to pneumatic tires and wheel rims of different types and they are capable of protecting the inner tube from all weaknesses or breaks in the wall of the outer casing. The patch as shown in the present instance comprises a body 1 which is preferably of segmental form and is composed of a relatively strong or tough structure which is capable of withstanding the relatively heavy pressure of the inner tube. A composite structure of rubber and strong fabric, such as canvas, vulcanized together, is suitable for this purpose. The body of the patch is preferably curved in a longitudinal direction in order that it may conform to the contour of the tire casing, and its transverse dimensions are such that it will cover the wall of the casing which is ordinarily engaged by the tube. A flap 2 is provided as a part of the patch, this flap being composed of relatively thin flexible material, for example, a sheet of canvas. This flap is fastened at one end to one of the longitudinal edges of the body of the patch by any suitable means, rivets 3 and stitching 4 being shown for this purpose. The flexible flap is adapted to lie within the body of the patch and is of a length to completely encircle the inner tube transversely. As shown, the flap is of a length to completely encircle the inner tube and to form part of another convolution about it. The patch is provided with means for holding it securely in position to prevent the patch from being forced outwardly, particularly in those cases where the casing is rim-cut or broken adjacent to the bead, and to prevent shifting of the patch within the casing. As shown, a series of individual hooks 5 is secured to one edge of the patch, and a series of clips 6 is secured to the opposite edge of the patch. These hooks and clips are preferably made of sheet metal having sufficient stiffness to retain their form. The hooks 5 are intended to fasten upon the bead at the respective side of the tire and the clips 6 to lie between the opposite bead and the wheel rim.

Figs. 1 and 2 show a mode of applying the patch to a tire of the ordinary clencher type, 7 designating the outer casing having beads 8 thereon, 9 designating the inner tube and 10 designating the flanged rim on which the tire is mounted. In practice, the patch is introduced into the outer casing 7 at a point where it will cover the blow-out or broken or weakened portion thereof, the hooks 5 on the patch being engaged over the adjacent bead of the casing. The inner tube is placed within the casing and the flap 2 is wrapped completely around the inner tube with its free end overlapping or extending past the attached end thereof. Prior to this operation, the tube may be inflated with sufficient air to expand it into round form. After the tube has been introduced and wrapped with the flap, the other bead of the casing is applied to the wheel rim, the clips 6 assuming a position between this bead and the channel of the rim. After this has been done, the inner tube is inflated to its normal pressure and the tire is then ready for use.

A repair patch embodying the present invention is relatively thin and hence it will minimize the tendency to injure or chafe the inner tube. As the tube is completely encircled by the flap, the tube is kept out of contact with any part liable to injure it. In the construction shown, the flap covers the rivets or other means of fastening the hooks and clips to the patch and there is no possibility of the tube coming into contact with these hooks or clips. By providing a series of hooks, creeping or shifting of the patch within the casing is prevented, as any tendency of the patch to creep will produce a rocking motion of the hooks and the hooks will then bind firmly between the bead and the flange of the rim, thereby resisting and preventing such movement. This individual rocking and binding action of the hooks is permitted in the construction shown by reason of the fact that the hooks are separately attached at intervals to the body 1 of the patch, the body of the patch being more or less pliable and hence will yield to permit the binding action of the hooks. The same binding action may be utilized in connection with the clips 6. It is preferable to use flat clips at one side of the patch, as shown, as this will greatly facilitate the operation of applying the respective bead of the casing to the rim, this being especially so in those cases where the beads on the casing have a close or tight fit with the rim.

I claim as my invention:—

1. A repair patch for pneumatic tires comprising a body adapted to be inserted between an outer casing and inner tube, and means for holding the body in position embodying hooks secured to one side of the body and adapted to fasten upon the adjacent bead of the casing, and flat clips secured to the opposite side of the body and adapted to lie between the bead of the casing and the wheel rim.

2. A repair patch for pneumatic tires comprising a body, a flexible flap secured at one end to said body at one side of the latter and of a length to encircle an inner tube and form an interior lining for said body, hooks at one side of said body adapted to coöperate with an edge of the casing, and clips at the opposite side of the body and adapted to coöperate with the opposite edge of the casing.

In testimony whereof I have hereunto set my hand in presence of two subscribing witnesses.

JOSHUA H. MARVIL OF V

Witnesses:
 JAS. E. TULL,
 FRED. M. HEARN.